UNITED STATES PATENT OFFICE.

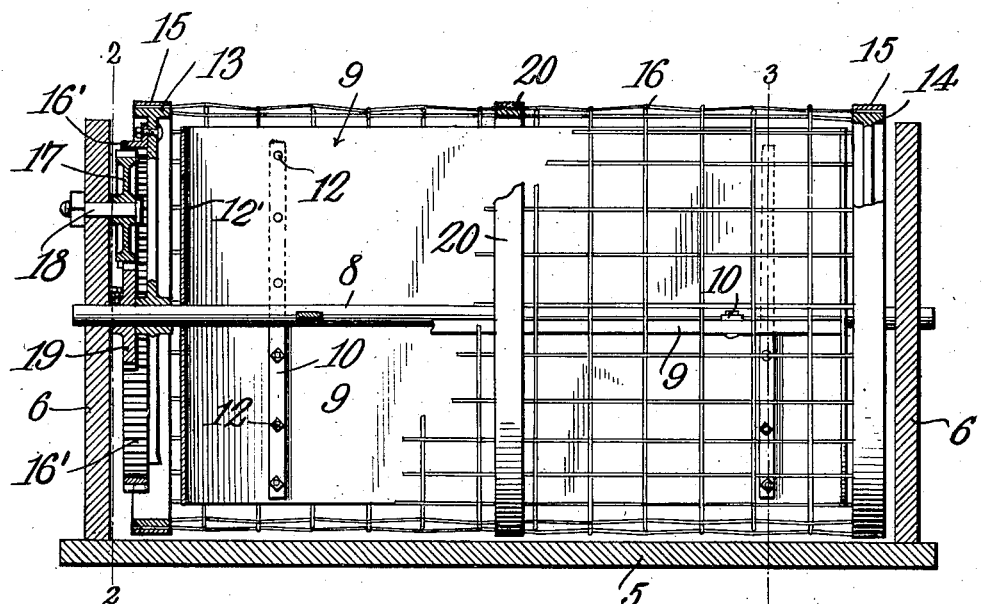
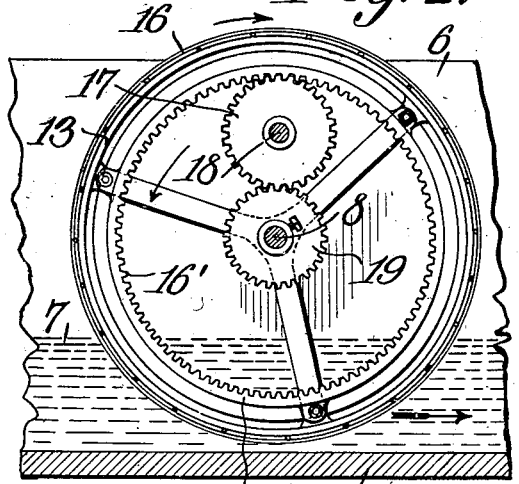
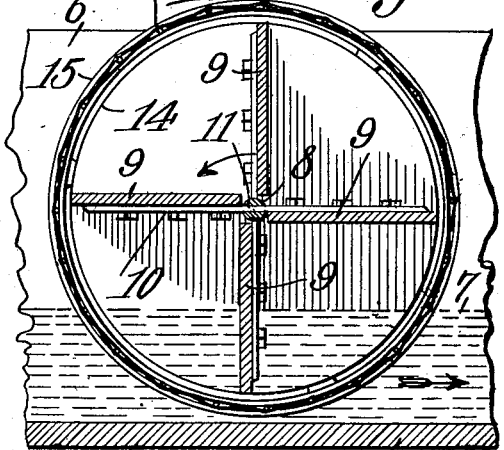

JEROME W. BARNARD, OF JOSEPH, OREGON, ASSIGNOR OF ONE-HALF TO GUSTAV C. SCHLUER, OF JOSEPH, OREGON.

REVOLVING FISH-SCREEN.

1,007,630.  Specification of Letters Patent.  Patented Oct. 31, 1911.

Application filed January 3, 1907. Serial No. 350,561.

*To all whom it may concern:*

Be it known that I, JEROME W. BARNARD, a citizen of the United States, residing at Joseph, in the county of Wallowa and State of Oregon, have invented a new and useful Revolving Fish-Screen, of which the following is a specification.

This invention relates to fish screens of that general class especially designed for use in irrigating ditches, canals, flumes and the like to prevent the fish from following the course of the stream and eventually becoming stranded on the land.

The object of the invention is to provide a revolving screen which when positioned in the ditch, flume, or other water course will afford an effectual barrier to the passage of fish without liability of becoming clogged or otherwise obstructed by leaves, twigs and other floating debris.

A further object of the invention is to provide a revolving screen having a water-wheel associated therewith and operatively connected with the screen whereby rotation of the water-wheel in one direction will cause a corresponding rotation of the screen in the opposite direction.

A still further object of the invention is to generally improve this class of devices so as to increase their utility, durability and efficiency.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a longitudinal sectional view of a revolving fish-screen constructed in accordance with my invention. Fig. 2 is a transverse sectional view taken on the line 2—2 of Fig. 1. Fig. 3 is a transverse sectional view taken on the line 3—3 of Fig. 1.

Similar numerals of reference indicate corresponding parts in all of the figures of the drawings.

The improved screen is principally designed for use in irrigating ditches, canals, flumes and other water courses and by way of illustration is shown applied to a flume of the ordinary construction in which 5 designates the base of the flume and 6 the vertical walls thereof defining the water course, indicated at 7. Journaled in the walls 6 of the flume and extending transversely across the same is a shaft 8 carrying a plurality of spaced radial blades or wings 9, the latter being rigidly secured to the shaft by means of metal-strips 10 passing through suitable openings 11 formed in the shaft and having their opposite ends riveted or otherwise rigidly secured to the blades 9 as indicated at 12. The blades 9 terminate short of the side walls 6 of the flume and are connected at one end by a circular plate or head 12' which assists in preventing accidental displacement of said blades.

Loosely mounted on the opposite ends of the shaft 8 and spaced from the adjacent vertical walls of the flume are wheels 13 and 14 to which are secured by suitable clamping rings 15 a wire covering constituting a screen 16. Bolted or otherwise rigidly secured to the spokes of the wheel 13 is a circular rack 16' the teeth of which engage the teeth of a pinion 17 mounted on a stub shaft 18 carried by the adjacent walls of the flume, there being a similar pinion 19 keyed or otherwise rigidly secured to the shaft 8 and meshing with the pinion 17, as shown. It will thus be seen that the water in the flume coming in contact with the blades 9 will rotate the same in the direction indicated by the arrow in Fig. 3 of the drawings and through the medium of the pinions 17 and 19 and rack 16' rotate the screen 16 in the opposite direction.

By having the screen mounted for rotation in the manner described said screen forms an effectual barrier to the passage of fish while at the same time preventing the accumulation of leaves and other floating debris against the surface of the screen.

When the ditch or flume is very wide two or more of the wheels 13 may be mounted on the shaft 8, as indicated at 20 so as to form an intermediate support for the screen and thereby prevent the latter from sagging.

From the foregoing description it will be seen that there is provided an extremely simple, inexpensive and efficient device admirably adapted for the attainment of the ends in view.

Having thus described the invention what is claimed is:

1. A device of the class described including a water-wheel mounted for rotation in one direction and a screen surrounding the water-wheel and mounted for rotation in the opposite direction.

2. A device of the class described including coacting members disposed one within the other and mounted for rotation in opposite directions, one of said members constituting a screen.

3. A device of the class described including a revolving screen, and means disposed within the same and rotating in the opposite direction for imparting motion to said screen.

4. A device of the class described including a water-wheel mounted for rotation in one direction, a screen surrounding the water-wheel, and gearing connecting the two for rotating the screen in the opposite direction.

5. A device of the class described including a shaft having a plurality of blades secured thereto, a screen surrounding the blades and provided with a circular rack, a pinion keyed to the shaft, and an intermediate pinion engaging the teeth on the rack and the first mentioned pinion.

6. A device of the class described including a shaft having spaced blades secured thereto and mounted for rotation therewith, supporting members loosely mounted on the shaft and spaced from the blades, a screen surrounding the blades and resting on the supporting members, means for clamping the screen in engagement with the supporting members, and gearing connecting the shaft and screen for rotating the same in opposite directions.

7. A device of the class described including a shaft, a water-wheel mounted for rotation with the shaft, supports loosely mounted on the shaft on each side of the water-wheel, a screen engaging the supports, clamping members for securing the screen in position on the supports, and means for rotating the screen and water-wheels in opposite directions.

8. A device of the class described including a shaft, a blade secured to and mounted for rotation with the shaft, a disk connecting one end of the blade, wheels loosely mounted on the shaft, a screen surrounding the blades and resting on the wheels, rings for clamping the screen in engagement with the wheels, a circular rack carried by one of the wheels, a pinion mounted for rotation with the shaft and a pinion engaging the first mentioned pinion and circular rack for rotating the blades and screen in opposite directions.

9. The combination with a casing, of a water wheel inclosed in said casing, and connections between the water wheel and the casing whereby the casing is rotated in a direction opposite to that of the water wheel.

10. In a fish guard, the combination with a cylindrical screen or casing, of a water wheel inclosed therein, and connections between the water wheel and casing, whereby the casing is rotated in the opposite direction and slower than the water wheel.

11. In a fish guard, the combination with a rotatable barrier, of a hydraulic motor incased therein and geared to rotate the barrier.

12. The combination with a hydraulic motor, of a cylindrical screen entirely inclosing the same, and reversing gearing interposed between the motor and screen.

13. In a device of the character described, a supporting frame, a shaft journaled in the same, a series of paddle blades connected to the shaft, and an inclosing drum adapted to operate in a reverse direction from the paddles.

14. In a device of the character described, a main shaft, supporting means for the same, paddles carried by the shaft, an outer screen, and mechanism connecting the main shaft with the outer screen so as to cause the same to turn in an opposite direction from the paddles on the main shaft.

15. The combination with a flume, of a transverse shaft mounted in the flume and provided with a spur gear, a screen loosely mounted on the shaft and having an internally toothed gear ring, a paddle wheel upon the shaft within the screen, and an intermediate gear meshing with the spur gear and gear ring.

16. The combination with a flume, of a cylindrical screen mounted in the flume, a current operated wheel mounted in the screen, and means for operating the screen from the said wheel.

17. In a fish dam, the combination of a base two vertical uprights secured thereto a spindle rotatably mounted in bearings in said uprights, a water wheel secured to said spindle, a cylindrical screen encircling said water wheel, means to hold said screen in spaced relation with said wheel, and means for the transmission of power from said spindle to said cylindrical screen, substantially as shown and described.

18. A fish screen, consisting of a supporting structure, a paddle wheel mounted in said structure, a drum screen inclosing said paddle wheel, and connections between the paddle wheel and screen for causing the paddle wheel and drum screen to rotate in opposite directions.

19. A fish screen, consisting of a suitably supported axle, a paddle wheel secured and a drum screen loosely mounted thereon, and connections between the wheel and drum for revolving the latter.

20. In a fish screen, the combination with a supporting frame, of a shaft carried thereby, a paddle wheel mounted on the shaft, a screened drum inclosing said wheel, and connections between the wheel and the drum for driving the drum in the opposite direction to that in which the wheel rotates.

In testimony that I claim the foregoing as my own, I have hereto affixed my signature in the presence of two witnesses.

JEROME W. BARNARD.

Witnesses:
 A. WURZWEILER,
 W. A. WRENN.